US009507637B1

(12) United States Patent
Saville, III

(10) Patent No.: US 9,507,637 B1
(45) Date of Patent: Nov. 29, 2016

(54) COMPUTER PLATFORM WHERE TASKS CAN OPTIONALLY SHARE PER TASK RESOURCES

(71) Applicant: Google Inc., Mountain View, CA (US)

(72) Inventor: Winthrop Lyon Saville, III, Soquel, CA (US)

(73) Assignee: Google Inc., Mountain View, CA (US)

( * ) Notice: Subject to any disclaimer, the term of this patent is extended or adjusted under 35 U.S.C. 154(b) by 371 days.

(21) Appl. No.: 13/962,660

(22) Filed: Aug. 8, 2013

(51) Int. Cl.
G06F 9/46 (2006.01)
G06F 9/50 (2006.01)

(52) U.S. Cl.
CPC .................................. *G06F 9/5016* (2013.01)

(58) Field of Classification Search
None
See application file for complete search history.

(56) References Cited

U.S. PATENT DOCUMENTS

| 5,765,157 | A * | 6/1998 | Lindholm | G06F 9/4843 |
| 8,289,324 | B1 | 10/2012 | Laine et al. | |
| 8,429,656 | B1* | 4/2013 | Duluk, Jr. | G06F 9/5027 712/22 |
| 2005/0188163 | A1* | 8/2005 | Asthana | G06F 8/62 711/159 |
| 2006/0101468 | A1* | 5/2006 | Massarenti | G06F 9/4843 718/102 |
| 2008/0126736 | A1* | 5/2008 | Heil | G06F 12/0253 711/171 |
| 2008/0313649 | A1* | 12/2008 | Tian | G06F 9/485 719/315 |

OTHER PUBLICATIONS

S. Bhatti et al., "MANTIS OS: An Embedded Multithreaded Operating System for Wireless Micro Sensor Platforms", Mobile Networks and Applications (MONET), Aug. 2005, pp. 563-579, vol. 10, issue 4, Springer-Verlag New York, Inc., Secaucus, NJ.

Damon, "Whats the difference between epoll, poll, threadpool?", stackoverflow.com, Jun. 28, 2012, available via the Internet at http://stackoverflow.com/questions/4093185/whats-the-difference-between-epoll-poll-threadpool (last visited Jan. 11, 2013).

A. Dunkels, "About Protothreads", dunkels.com, Oct. 7, 2005, available via the Internet at http://dunkels.com/adam/pt/about.html (last visited Jan. 11, 2013).

A. Dunkels, "Protothreads", dunkels.com, Oct. 2, 2006, available via the Internet at http://dunkels.com/adam/pt/index.html (last visited Jan. 11, 2013).

B. Gu et al., "Shared-stack Cooperative Threads", Proceedings of the 2007 ACM Symposium on Applied Computing, Mar. 11, 2007, pp. 1181-1186, ACM, New York, NY.

D. Kegel, "The C10K Problem", kegel.com, Jul. 21, 2011, available via the Internet at http://www.kegel.com/c10k.html (last visited Jan. 11, 2013).

K. Klues, "TOSThreads: Toward a TinyOS Kernel", Feb. 4, 2009, Distributed Systems, RWTH Aachen, Aachen, Germany, available via the Internet at http://ds.informatik.rwth-aachen.de/teaching/ws0809/tinyos/TosThreads-aachen.pdf (last visited Aug. 19, 2013).

(Continued)

*Primary Examiner* — Sisley Kim
(74) *Attorney, Agent, or Firm* — McDonnell Boehnen Hulbert & Berghoff LLP

(57) ABSTRACT

Disclosed are apparatus and methods for managing thread resources. A computing device can generate threads for an executable application. The computing device can receive an allocation request to allocate thread-specific memory for an executable thread of the threads, where thread-specific memory includes a call stack for the executable thread. In response to the allocation request, the computing device can: allocate the thread-specific memory and indicate that the executable thread is ready for execution. The computing device can execute the executable thread. The computing device can receive a sleep request to suspend executable thread execution. In response to the sleep request, the computing device can determine whether the allocated thread-specific memory is to be deallocated. After determining that the allocated thread-specific memory is to be deallocated: the thread-specific memory can be deallocated and an indication that the executable thread execution is suspended can be provided.

23 Claims, 8 Drawing Sheets

(56) References Cited

OTHER PUBLICATIONS

W. P. McCartney et al., "Stackless Preemptive Threads for TinyOS", Proceedings of the 7th IEEE International Conference on Distributed Computing in Sensor Systems (DCOSS'11). Jun. 27, 2011, Barcelona, Spain.

Microsoft, "ThreadPool Class", msdn.microsoft.com, Jan. 2013, available via the Internet at http://msdn.microsoft.com/en-us/library/system.threading.threadpool.aspx (last visited Jan. 11, 2013).

Oracle et al., "Class Executors", Java Platform Standard Edition 7, Jan. 2012, docs.oracle.com, available via the Internet at http://docs.oracle.com/javase/7/docs/api/java/util/concurrent/Executors.html (last visited Jan. 11, 2013).

Quantum Leaps, "About QP(TM)", Oct. 30, 2012, available via the Internet at http://www.state-machine.com/qp/(last visited Jan. 11, 2013).

B. Rempt, "Working with Stackless Python and Microthreads", Inform IT, Sep. 7, 2001, available via the Internet at http://www.informit.com/articles/article.aspx?p=23294 (last visited Jan. 11, 2013).

Wikimedia Foundation, Inc., "Contiki" (embedded operating system), en.wikipedia.org, Dec. 24, 2012, available via the Internet at http://en.wikipedia.org/w/index.php?title=Contiki&oldid=529601894 (last visited Jan. 11, 2013).

* cited by examiner

Example Parallel Thread Execution

```
210  StartThreads(Thrds, trs, start_count);    ->
     PARALLEL OPERATION OF THREADS ts[0] = TT[2] AND ts[1] = NTT[2] BEGINS:
220  ALLOC_TSM(ts[0]);                    222  ALLOC_TSM(ts[1]);
230  Activate_Thread(ts[0],trs[0]);       232  Activate_Thread(ts[1],trs[1]);
240  ts[0].work(trs[0]);                  242  ts[1].work(trs[1]);
244  preprocess();                        246  preprocess();
250  <OS puts thread to sleep             252  <OS puts thread to sleep
      during preprocess>                         during preprocess>
254  preprocess() restarted               256  preprocess() restarted
260  do_work(trs[0]);                     262  do_work(trs[1]);
270  postprocess();                       272  postprocess();
280  DEALLOC_TSM(ts[0]);                  282  DEALLOC_TSM(ts[1]);
```

210A
ID = 2
TSMReallocBit = ENABLE
State = Dead
SP = null
RP = null
PC = null

220A
ID = 2
TSMReallocBit = ENABLE
State = Ready
SP =
RP =
PC = null

210B
ID = 22
TSMReallocBit = DISABLE
State = Ready
SP
RP
PC = null

222A
ID = 22
TSMReallocBit = DISABLE
State = Ready
SP
RP
PC = null

COMPUTER PLATFORM WHERE TASKS CAN OPTIONALLY SHARE PER TASK RESOURCES

BACKGROUND

Unless otherwise indicated herein, the materials described in this section are not prior art to the claims in this application and are not admitted to be prior art by inclusion in this section.

Modern operating systems can provide interfaces for various portions of a user interface for a computing device. For example, typical operating systems provide support to load image, audio, and video data into memory, unload the same data from memory, and for displaying image data and/or playing audio and/or video data that is in memory. Operating system support can include specific support for image, audio, and/or video data and/or can be part of a general package for utilizing blocks of memory.

In some cases, the operating system can also provide support for memory management for executing applications. For example, the operating system can provide a run-time system, including a memory manager to support execution of software written in programming languages that frequently allocate and deallocate blocks of memory.

SUMMARY

In one aspect, a method is provided. A computing device generates a plurality of threads associated with an application configured for execution on the computing device. The computing device receives an allocation request to allocate thread-specific memory for an executable thread of the plurality of threads. The thread-specific memory includes a call stack for the executable thread. In response to the allocation request, the computing device: allocates storage for the thread-specific memory, establishes an association between the allocated thread-specific memory and the executable thread, and provides an indication that the executable thread is ready for execution. After providing the indication that the executable thread is ready for execution, the computing device executes the executable thread. The computing device receives a sleep request to suspend execution of the executable thread. In response to the sleep request, the computing device: determines whether storage is to be deallocated for the allocated thread-specific memory, and in response to determining that storage is to be deallocated for the allocated thread-specific memory: deallocates storage for the allocated thread-specific memory, removes the association between the allocated thread-specific memory and the executable thread, and provides an indication that execution of the executable thread is suspended.

In another aspect, an article of manufacture is provided. The article of manufacture includes a non-transitory computer-readable storage medium having instructions stored thereon that, when executed on by a processor, cause the processor to perform functions. The functions include: generating a plurality of threads associated with an application configured for execution by the processor; receiving an allocation request to allocate thread-specific memory for an executable thread of the plurality of threads, wherein the thread-specific memory comprises a call stack for the executable thread; in response to the allocation request: allocating storage for the thread-specific memory, establishing an association between the allocated thread-specific memory and the executable thread, and providing an indication that the executable thread is ready for execution; after providing the indication that the executable thread is ready for execution, executing the executable thread; receiving a sleep request to suspend execution of the executable thread; and in response to the sleep request to suspend execution of the executable thread: determining whether storage is to be deallocated for the allocated thread-specific memory, and in response to determining that storage is to be deallocated for the allocated thread-specific memory: deallocating storage for the allocated thread-specific memory, removing the association between the allocated thread-specific memory and the executable thread, and providing an indication that execution of the executable thread is suspended.

In another aspect, a computing device is provided. The computing device includes a processor and a non-transitory computer-readable storage medium having instructions stored thereon that, when executed by the processor, cause the processor to perform functions. The functions include: generating a plurality of threads associated with an application configured for execution by the processor; receiving an allocation request to allocate thread-specific memory for an executable thread of the plurality of threads, wherein the thread-specific memory comprises a call stack for the executable thread; in response to the allocation request: allocating storage for the thread-specific memory, establishing an association between the allocated thread-specific memory and the executable thread, and providing an indication that the executable thread is ready for execution; after providing the indication that the executable thread is ready for execution, executing the executable thread; receiving a sleep request to suspend execution of the executable thread; and in response to the sleep request to suspend execution of the executable thread: determining whether storage is to be deallocated for the allocated thread-specific memory, and in response to determining that storage is to be deallocated for the allocated thread-specific memory: deallocating storage for the allocated thread-specific memory, removing the association between the allocated thread-specific memory and the executable thread, and providing an indication that execution of the executable thread is suspended.

In another aspect, a method is provided. A computing device receives an allocation request to allocate thread-specific memory for an executable thread of a plurality of threads associated with an application configured for execution on the computing device. In response to the allocation request, the computing device allocates storage for the thread-specific memory and provides an indication that the executable thread is ready for execution. The computing device receives a sleep request to suspend execution of the executable thread. In response to the sleep request, the computing device determines whether storage for the allocated thread-specific memory is to be deallocated. In response to determining that storage for the allocated thread-specific memory is to be deallocated, the computing device deallocates storage for the allocated thread-specific memory and provides an indication that execution of the executable thread is suspended.

In even another aspect, a device is provided. The device includes: means for processing; means for generating a plurality of threads associated with an application configured for execution by the means for processing; means for receiving an allocation request to allocate storage for thread-specific memory for an executable thread of the plurality of threads, where the thread-specific memory includes a call stack for the executable thread; means for, in response to the allocation request: allocating storage for the thread-specific memory: establishing an association between the allocated thread-specific memory and the executable thread, and providing an indication that the executable thread is ready for execution; means for, after providing the indication that the executable thread is ready for execution, executing the executable thread; means for receiving a sleep request to suspend execution of the executable thread; and means for, in response to the sleep request: determining whether storage is to be deallocated for the allocated thread-specific memory and in response to determining that storage is to be deallocated for the allocated thread-specific memory: deallocating storage for the allocated thread-specific memory; removing the association between the allocated thread-specific memory and the executable thread, and providing an indication that execution of the executable thread is suspended.

BRIEF DESCRIPTION OF THE FIGURES

In the figures:

FIGS. 2A through 2D show a thread execution scenario, in accordance with an example embodiment.

DETAILED DESCRIPTION

Overview

Figure 1A:
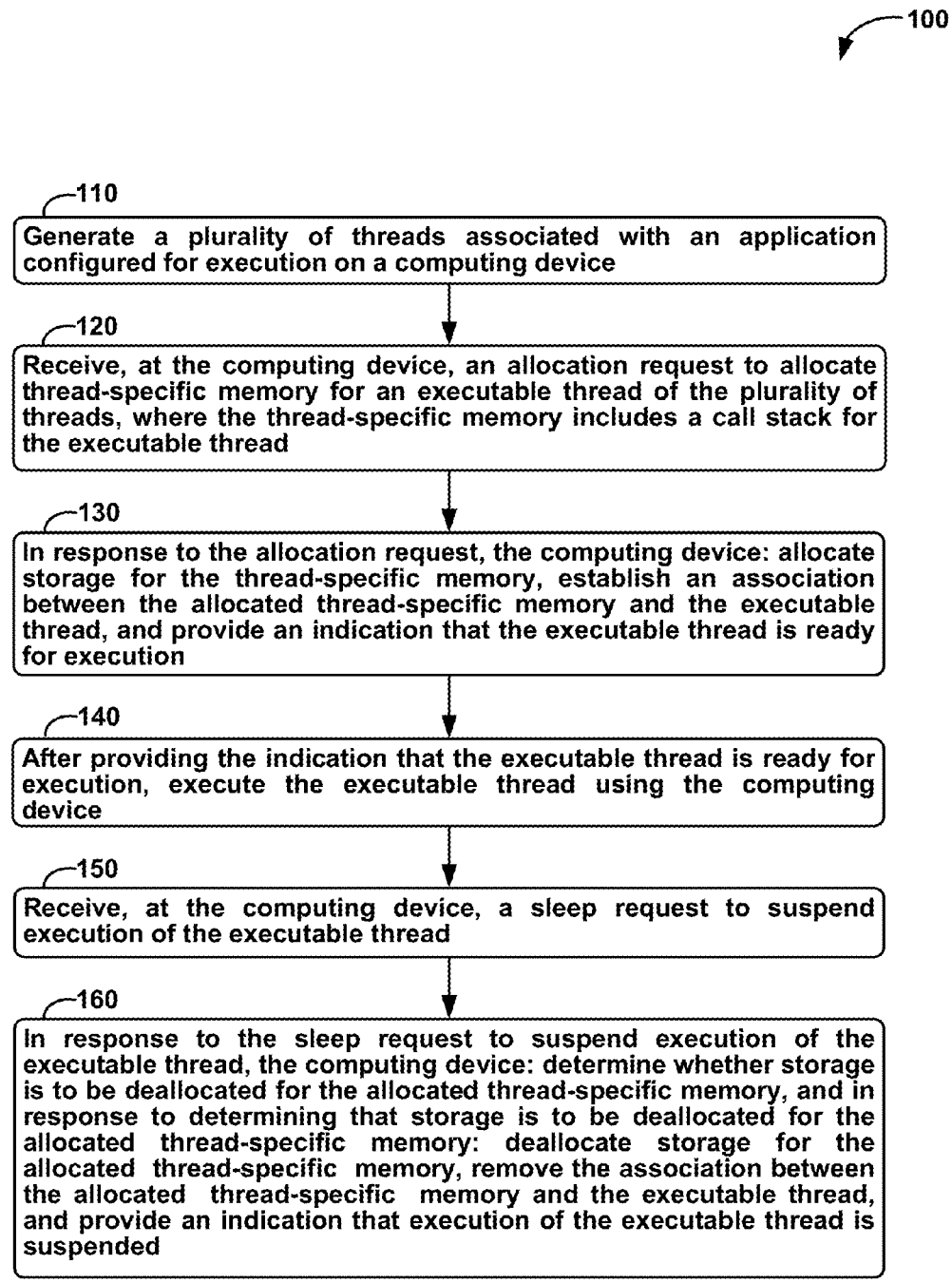
FIG. 1A is a flow chart of a method, in accordance with an example embodiment.

A modern computing device can include an operating system, which is software that manages hardware resources of the computing device and provides common services for computer programs that execute on the computing device. Application programs, or simply applications, can use the services provided by the operating system to carry out one or more tasks.

Some of the services provided by some operating systems enable multiple threads of execution, or multi-threading, to run on the computing device at virtually the same time. For example, the computing device can provide applications with functions for creating, initializing, executing, suspending thread execution, and destroying threads. In some cases, the operating system can support applications that use more than one thread at a time by scheduling threads for execution by processor(s) of the computing device. Each thread can perform one or more tasks for the application, such as but not limited to: performing computations, processing input and/or generating output for the application, handling errors or exceptions, and event processing.

Each thread can use resources to carry out its tasks for the application. In particular, each thread can have thread-specific memory (TSM) allocated to the thread. This thread-specific memory could be used as a stack and perhaps register data or other uses. One example of a stack the thread could use is a "call stack" or a data structure that stores an address for each subroutines or function called by the thread during execution. In some cases, the stack can include one or more stack frames. For a given subroutine (or function) called by the thread, the corresponding stack frame can store the address of the subroutine (or function); value(s) of parameter(s), if any, provided to the subroutine (or function); and local variables, which are data allocated for use by the subroutine (or function). As such, a stack of stack frames includes a call stack, as each stack frame includes the address of a subroutine or function called by the thread. The register data can include storage for holding data stored in one or more registers. Each register can part of a processor of a computing device that store a small amount of data, e.g., 4, 8, or 16 bytes, for quick access by the processor.

Threads can have execution states, such an executing state when the thread is being executed, or a sleep state, when the thread is suspended from execution, and so not currently being executed. In one example, a thread can be one of six possible execution states: an initializing state, a sleep state, a ready state, an active state, a deinitializing state, and a dead state. The initializing state can be a state where the thread is getting ready for eventual execution; for example, during the initializing state, resources can be allocated to the thread, variables can be set to initial values, etc. A sleep state can be a state when the thread is suspended from execution, and so not currently being executed. A ready state can be a state where the thread is available for execution to carry out tasks for its application, but is not executing; e.g., is scheduled for future execution. An active, or running, state can be a state when the thread is being executed and carrying out tasks for its application. The deinitializing state can be a state where the thread is getting ready for eventual termination. The dead state can indicate that the thread is terminated and currently unavailable for execution without (re)initialization. More, fewer, and/or different execution states for threads are possible as well.

A thread can be put to sleep—that is, put into the sleep state—either before or after the thread completes its task for the application. The thread can be put to sleep before completing its task by the operating system, typically because some other thread, application, or process preempted execution of the thread. Preemption can occur for a number of reasons—some examples include a priority of the other thread, application, or process can be higher than a priority of the thread, the other thread, application, or process can require resources uses by the thread, the thread may have been scheduled to run for a fixed period of time (e.g., a fixed time slice) and the time has expired. Other reasons for preemption are possible as well.

When the thread completes its task for the application, the thread can execute a specified sleep function or other function provided by the operating system to let the thread inform the operating system that the thread has completed its task for the application and may be available to perform another task. In some embodiments, a thread is killed, or put into a dead state after deinitialization upon completion of its task.

After allocation, many threads can remain in the sleep state for long periods of time. In operation, the number of threads in the sleep state often far exceeds the number of active threads. Further, by definition, sleeping threads are suspended from execution and so are not doing any work. Therefore, the operating system can be configured to reduce the resources used by sleeping threads, thereby reducing the average amount of resources used per thread, with minimal effect on task performance. In some situations, thread-specific memory can be retained by a sleeping thread. For example, if the operating system preempts the thread and put the thread to sleep before completion of a task, the stack and other thread-specific memory for the thread can remain allocated to the thread. As such, upon reactivation of the preempted thread, the thread can immediately continue execution, rather than have to wait for allocation of thread-specific memory.

The operating system and threads can use one or more mechanisms to decide when thread-specific memory is to be allocated or deallocated. One mechanism is that a thread can call an explicit function to switch execution states from a running state to a sleep state and request that the operating system deallocate thread-specific memory as the thread no longer needs the thread-specific memory; e.g., SleepWithStackRemoval( ). Similarly, the operating system can call another explicit function to switch execution states for a thread from the sleep state to a ready state and request that the operating system allocate thread-specific memory as needed; e.g., AwakeWithStackAllocation( ).

Thread-specific memory allocation and deallocation can be controlled by use of specifically-named functions; e.g., SleepWithStackRemoval( ), AwakeWithStackAllocation( ), and/or by use of parameters passed into more general functions; e.g., an deallocate_stack parameter passed into a general sleep( ) function, where the deallocate_stack parameter is set to TRUE if the thread requests deallocation of thread-specific memory or set to FALSE if the thread does not request deallocation of thread-specific memory. Similarly, an allocate_stack parameter can be used to control allocation of thread-specific memory when the thread transitions to a ready state. In some embodiments, data such as the deallocate_stack and/or allocate_stack parameter(s) can be stored in a data structure associated with the thread; e.g., stored as data in a Thread object.

In some embodiments, a thread starts execution by use of an "entry point". For example, to start execution, the thread can call a well-known function (e.g., main( ) for C or C++ programs) as an entry point function. The operating system can call the entry point function when initially executing the thread. Thread execution can complete when the entry point function returns or otherwise terminates. For threads using entry point functions, the operating system can perform an effective AwakeWithStackAllocation( ) just prior to executing the entry point function and can perform an effective SleepWithStackRemoval( ) when the entry point function terminates.

In particular embodiments, the operating system can examine data associated with the thread, such as a stack pointer or an allocation bit respectively set to a non-null or TRUE value if thread-specific memory has been allocated or respectively set to a null or FALSE value if thread-specific memory has not been allocated. By examining these data to determine if thread-specific memory has been allocated to the thread prior to changing the thread's execution state to ready, the operating system can allocate thread-specific memory if not already allocated to the thread prior to setting the execution state of the thread to a ready and/or running state. Similarly, the operating system can examine the stack pointer and/or the allocation bit to determine whether thread-specific memory is to be deallocated prior to setting the execution state of the thread to a sleep, deinitialized, and/or or dead state.

The deallocation of stacks and other processor storage for sleeping threads can significantly reduce memory required by devices that allocate a large number of threads. For example, suppose a computing device has allocated 16K threads on average during operation with each thread allocated 4 Kbytes of processor storage. Of these 16K threads, during typical device operation, suppose that 1K threads are not sleeping and 15K threads are sleeping. Then, if the 4 Kbytes/thread remain allocated throughout the life of the thread, then 16K×4 Kbytes=64 Mbytes of processor storage are required. However, if only non-sleeping threads are allocated processor storage, then on average, only 4 Mbytes of processor storage are required. In this example, a reduction of 93.75% of the processor storage used while 16K threads are allocated can be achieved with a minimal alteration of performance of executing threads. In some embodiments, some or all of the saving in thread-specific memory allocation can be realized without changing application software; e.g., by the operating system always deallocating stacks from threads entering a deinitializing execution state, and by always allocating stacks to threads entering an initializing execution state. The processor storage no longer allocated for sleeping threads can be used by the computing device to provide additional applications, and their services, to user(s) of the computing device.

Example Operations

Turning to the figures, FIG. 1A is a flow chart of method 100, in accordance with an example embodiment. Method 100 begins at block 110, where a computing device can generate a plurality of threads associated with an application configured for execution on the computing device.

At block 120, the computing device can receive an allocation request. The allocation request can be a request to allocate storage for thread-specific memory for an executable thread of the plurality of threads. The thread-specific memory can include a call stack for the executable thread.

At block 130, in response to the allocation request, the computing device can allocate storage for the thread-specific memory, establish an association between the allocated thread-specific memory and the executable thread, and provide an indication that the executable thread is ready for execution. In some embodiments, the allocated thread-specific memory can include storage for a local variable. In other embodiments, the computing device can include one or more registers, where each register is configured to store at least one bit. In these other embodiments, the allocated thread-specific memory can further include storage for processor register data to store contents of the one or more registers for the executable thread.

In some cases, the call stack can include return addresses of functions and/or subroutines called by a thread. Thread-specific memory can include storage for additional data beyond storage of return addresses in a call stack. For example, thread-specific memory can include storage for processor register data, local variables, and/or platform-specific data. In other cases, processor register data can be stored with the call stack; while in other cases, processor register data is stored separately from the call stack.

In other cases, the call stack can include additional storage for storing variables and perhaps other data related with a thread; i.e. the call stack can store stack frames. Each stack frame can store a return address, parameters, and/or variables associated with a function or subroutine called by the thread. In some embodiments, an amount of memory allocated to the call stack can be larger than expected to be used by most threads.

At block 140, the computing device can, after providing the indication that the executable thread is ready for execution, execute the executable thread. In some embodiments, the executable thread can be configured to perform at least one task for the application. In these embodiments, executing the executable thread using the computing device can include executing the executable thread to perform the at least one task.

At block 150, the computing device can receive a sleep request. The sleep request can be a request to suspend execution of the executable thread. In some embodiments, the computing device can receive the sleep request to suspend execution of the executable thread via a function referenced by the executable thread. In particular embodiments, the function referenced by the executable thread comprises a thread-specific-storage-allocation parameter. In these embodiments, determining whether storage is to be deallocated for the allocated thread-specific memory can include determining whether storage is to be deallocated for the allocated thread-specific memory based on the thread-specific-storage-allocation parameter.

In other embodiments, receiving the sleep request to suspend execution of the executable thread can include determining whether the executable thread has returned from a thread entry point; and in response to determining that the executable thread has returned from the thread entry point, suspending execution of the executable thread at the computing device.

At block 160, in response to the sleep request to suspend execution of the executable thread, the computing device can determine whether storage is to be deallocated for the allocated thread-specific memory. In response to determining that storage is to be deallocated for the allocated thread-specific memory, the computing device can: deallocate storage for the allocated thread-specific memory, remove the association between the allocated thread-specific memory and the executable thread, and provide an indication that execution of the executable thread is suspended.

In some embodiments, method 100 can further include: receiving a request to restart the executable thread for execution and determining whether thread-specific memory is allocated to the executable thread. In particular of these embodiments, method 100 can further include: in response to determining that thread-specific memory is not allocated to the executable thread: reallocating the allocated thread-specific memory to the executable thread; and establishing an association between the reallocated thread-specific memory and the executable thread.

In other particular of these embodiments, method 100 can further include: making a request to allocate at least as much storage to the executable thread as allocated to the allocated thread-specific memory; determining whether the request to allocate the at least as much storage is a successful request; and in response to the request to allocate the at least as much storage being a successful request: allocating a second thread-specific memory to the executable thread, where the second thread-specific memory includes a call stack, where the second thread-specific memory differs from the allocated thread-specific memory, and where the at least as much storage comprises the second thread-specific memory, and establishing an association between the second thread-specific memory and the executable thread.

In still other particular of these embodiments, method 100 can further include: in response to determining that thread-specific memory is not allocated to the executable thread: making a request to allocate at least as much storage to the executable thread as allocated to the allocated thread-specific memory; determining whether the request to allocate the at least as much storage is a successful request; and in response to the request to allocate the at least as much storage being an unsuccessful request awaiting availability of the at least as much storage for use by the executable thread, allocating a new thread-specific memory to the executable thread from the at least as much storage, where the new thread-specific memory includes a call stack, and establishing an association between the new thread-specific memory and the executable thread.

In yet even other particular of these embodiments, method 100 can further include: in response to determining that thread-specific memory is not allocated to the executable thread: making one or more requests to allocate at least as much storage to the executable thread as allocated to the allocated thread-specific memory; determining whether all of the one or more requests are unsuccessful requests; and in response to determining that all of the one or more requests are unsuccessful, providing an indication that thread-specific memory for the executable thread is unavailable and setting an execution state for the executable thread to deinitialized.

Figure 1B:
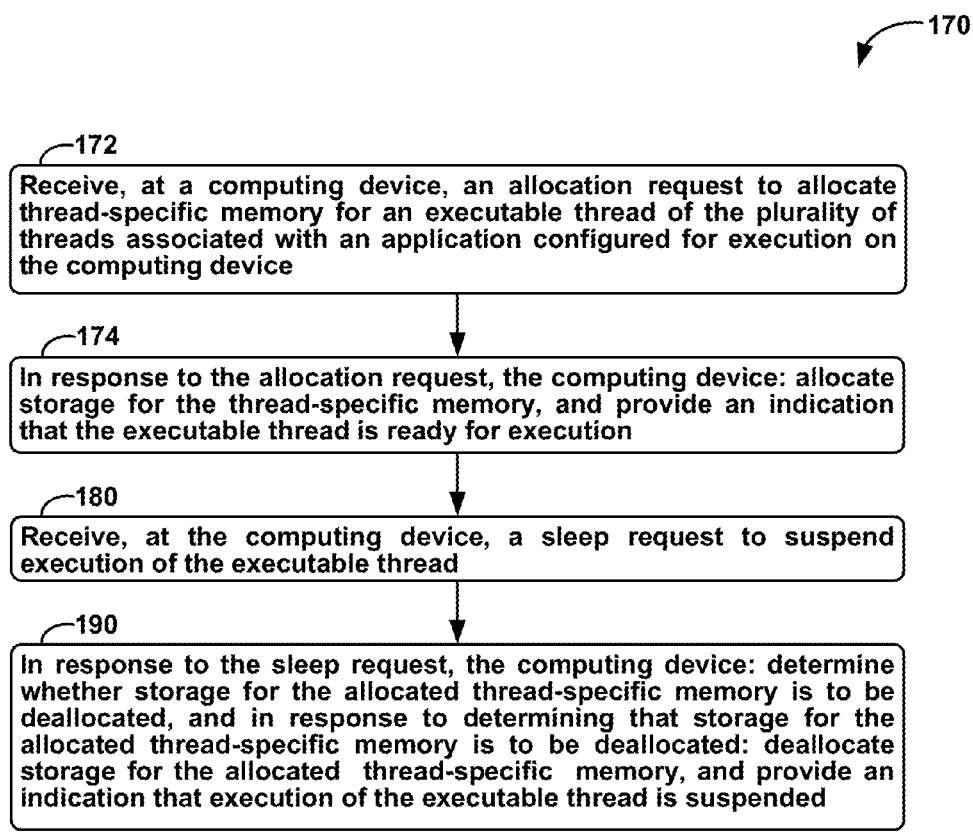
FIG. 1B is a flow chart of another method, in accordance with an example embodiment.

FIG. 1B is a flow chart of method 170, in accordance with an example embodiment. Method 170 begins at block 172, where a computing device can receive an allocation request. The allocation request can be a request to allocate storage for thread-specific memory for an executable thread of a plurality of threads associated with an application configured for execution on the computing device. In some embodiments, the thread-specific memory can include a call stack for the executable thread.

At block 174, in response to the allocation request, the computing device can allocate storage for the thread-specific memory and provide an indication that the executable thread is ready for execution. In some embodiments, the allocated thread-specific memory can include storage for a local variable. In other embodiments, the computing device can include one or more registers, where each register is configured to store at least one bit. In these other embodiments, the allocated thread-specific memory can further include storage for processor register data to store contents of the one or more registers for the executable thread.

In some cases, the call stack can include return addresses of functions and/or subroutines called by a thread. Thread-specific memory can include storage for additional data beyond storage of return addresses in a call stack. For example, thread-specific memory can include storage for processor register data, local variables, and/or platform-specific data. In other cases, processor register data can be stored with the call stack; while in other cases, processor register data is stored separately from the call stack.

In other cases, the call stack can include additional storage for storing variables and perhaps other data related with a thread; i.e. the call stack can store stack frames. Each stack frame can store a return address, parameters, and/or variables associated with a function or subroutine called by the thread. In some embodiments, an amount of memory allocated to the call stack can be larger than expected to be used by most threads.

In some embodiments, the executable thread can be configured to perform at least one task for the application. In these embodiments, executing the executable thread using the computing device can include executing the executable thread to perform the at least one task.

At block 180, the computing device can receive a sleep request. The sleep request can be a request to suspend execution of the executable thread. In some embodiments, the computing device can receive the sleep request to suspend execution of the executable thread via a function referenced by the executable thread. In particular embodiments, the function referenced by the executable thread comprises a thread-specific-storage-allocation parameter. In these embodiments, determining whether storage is to be deallocated for the allocated thread-specific memory can include determining whether storage is to be deallocated for the allocated thread-specific memory based on the thread-specific-storage-allocation parameter.

In other embodiments, receiving the sleep request to suspend execution of the executable thread can include determining whether the executable thread has returned from a thread entry point; and in response to determining that the executable thread has returned from the thread entry point, suspending execution of the executable thread at the computing device.

At block 190, in response to the sleep request, the computing device can determine whether storage for the allocated thread-specific memory is to be deallocated. In response to determining that storage for the allocated thread-specific memory is to be deallocated, the computing device can: deallocate storage for the allocated thread-specific memory and provide an indication that execution of the executable thread is suspended.

In some embodiments, method 170 can further include: receiving a request to restart the executable thread for execution and determining whether thread-specific memory is allocated to the executable thread. In particular of these embodiments, method 170 can further include: in response to determining that thread-specific memory is not allocated to the executable thread: reallocating the allocated thread-specific memory to the executable thread; and establishing an association between the reallocated thread-specific memory and the executable thread.

In other particular of these embodiments, method 170 can further include: making a request to allocate at least as much storage to the executable thread as allocated to the allocated thread-specific memory; determining whether the request to allocate the at least as much storage is a successful request; and in response to the request to allocate the at least as much storage being a successful request: allocating a second thread-specific memory to the executable thread, where the second thread-specific memory includes a call stack, where the second thread-specific memory differs from the allocated thread-specific memory, and where the at least as much storage comprises the second thread-specific memory, and establishing an association between the second thread-specific memory and the executable thread.

In still other particular of these embodiments, method 170 can further include: in response to determining that thread-specific memory is not allocated to the executable thread: making a request to allocate at least as much storage to the executable thread as allocated to the allocated thread-specific memory; determining whether the request to allocate the at least as much storage is a successful request; and in response to the request to allocate the at least as much storage being an unsuccessful request awaiting availability of the at least as much storage for use by the executable thread, allocating a new thread-specific memory to the executable thread from the at least as much storage, where the new thread-specific memory includes a call stack, and establishing an association between the new thread-specific memory and the executable thread.

In yet even other particular of these embodiments, method 170 can further include: in response to determining that thread-specific memory is not allocated to the executable thread: making one or more requests to allocate at least as much storage to the executable thread as allocated to the allocated thread-specific memory; determining whether all of the one or more requests are unsuccessful requests; and in response to determining that all of the one or more requests are unsuccessful, providing an indication that thread-specific memory for the executable thread is unavailable and setting an execution state for the executable thread to deinitialized.

Example Thread Execution Scenarios

As mentioned above, the operating system and threads can use one or more mechanisms to decide when thread-specific memory is to be allocated or deallocated. One mechanism is that a thread can call an explicit function to switch execution states from a running state to a sleep state and request that the operating system deallocate thread-specific memory as the thread no longer needs the thread-specific memory; e.g., SleepWithStackRemoval( ). Similarly, a thread can call another explicit function to switch execution states from the sleep state to a ready state and request that the operating system allocate thread-specific memory as needed; e.g., AwakeWithStackAllocation( ).

Thread-specific memory allocation and deallocation can be controlled by use of specifically-named functions; e.g., SleepWithStackRemoval( ), AwakeWithStackAllocation( ), and/or by use of parameters passed into more general functions; e.g., an deallocate_stack parameter passed into a general sleep( ) function, where the deallocate_stack parameter is set to TRUE if the thread requests deallocation of thread-specific memory or set to FALSE if the thread does not request deallocation of thread-specific memory. Similarly, an allocate_stack parameter can be used to control allocation of thread-specific memory when the thread transitions to a ready state. In some embodiments, data such as the deallocate_stack and/or allocate_stack parameter(s) can be stored in a data structure associated with the thread; e.g., stored as data in a Thread object.

In some embodiments, a thread starts execution by use of an "entry point". For example, to start execution, the thread can call a well-known function (e.g., main( ) for C or C++ programs) as an entry point function. The operating system can call the entry point function when initially executing the thread. Thread execution can complete when the entry point function returns or otherwise terminates. For threads using entry point functions, the operating system can perform an effective AwakeWithStackAllocation( ) just prior to executing the entry point function and can perform an effective SleepWithStackRemoval( ) when the entry point function terminates.

In particular embodiments, the operating system can examine data associated with the thread, such as a stack pointer or an allocation bit respectively set to a non-null or TRUE value if thread-specific memory has been allocated or respectively set to a null or FALSE value if thread-specific memory has not been allocated. By examining these data to determine if thread-specific memory has been allocated to the thread prior to changing the thread's execution state to ready, the operating system can allocate thread-specific memory if not already allocated to the thread prior to setting the execution state of the thread to a ready and/or running state. Similarly, the operating system can examine the stack pointer and/or the allocation bit to determine whether thread-specific memory is to be deallocated prior to setting the execution state of the thread to a sleep, deinitialized, and/or or dead state.

FIGS. 2A through 2D show thread execution scenario 200 in accordance with an example embodiment related to pseudo-code shown in Tables 1 and 2 below.

TABLE 1

PSUEDO CODE FOR SCENARIO 200

```
0001 class Thread {            // example Thread definition
0002        Memory pStack;     // storage for a processor stack
0003        int StackSize;     // size of stack
0004        State curState;    // execution state
0005        work(TaskReq tr);  // work function (see below)
0006        ...                // other data possible
0006 }                         // end of definition
0007 StartThreads(struct Thread ts[ ],
0008              struct TaskReq trs[ ], int count)
0009 {
```

TABLE 1-continued

PSUEDO CODE FOR SCENARIO 200

```
0010          parallel_for(i = 0; i < count; i++) {
0011              ALLOC_TSM(ts[i]);
0012              Activate_Thread(ts[i], trs[i]);
0013              DEALLOC_TSM(ts[i]);
0014          }
0015 }
0016 Activate_Thread(struct Thread T, TaskReq tr)
0017 {
0018      T.work(tr);
0019 }
// work is a method of Thread class - see line 0005 above
0020 public void work(TaskReq tr)
0021 {
``` each performing. One thread is a "temporary-thread-specific memory" thread, or a thread with the TSMReallocBit enabled. The second thread is a "non-temporary-thread-specific memory thread", or a thread with the TSMReallocBit disabled.

Scenario 200 begins with an application making two calls to a GenThreads function, shown as pseudo-code on lines 0001-0014 of Table 2 below, to create two arrays of threads: TT, which is an array of temporary-thread-specific memory threads, and NTT, which is an array of non-temporary-thread-specific memory threads. The two GenThreads calls shown on lines 0015 and 0016 of Table 2 can respectively create the Ti array and the NTT arrays and/or allocate threads to an application process. Lines 0017 to 0021 set up a call to Start Threads, which is then called on line 0023 of Table 2.

TABLE 2

Initializations For Scenario 200

```
0001 void GenThreads(Thread array[ ], int count,
0002                 method *worker, TSMReallocBit TRB)
0003 {
0004     int i, start_count = 2;
0005     Thread ts[2];
0006     TaskReq trs[2];
0007
0008     if (count < 0) { return };          // verify count
0009     array = new Thread[count];          // create empty threads
0010     for (i = 0; i < count; i++) {       // for each thread
0011         array[i].TSMReallocBit = TRB;       // set TSM realloc bit
0012         array[i].work = worker;             // and set worker function
0013     }                                   // end for each thread
0014 }                                       // end of GenThreads
0015 GenThreads(TT, 20,work,ENABLE)          // TT=Temp-TSM Threads
0016 GenThreads(NTT, 20,work,DISABLE)        // NTT= Non-Temp TSM Threads
0017 // set up threads ts[ ] and task requests trs[ ] arrays
0018 ts[0] = TT[2]; // first thread to run = TT[2]
0019 ts[1] = NTT[2]; // second thread to run = NTT[2]
0020 trs[0] = generate_task(TT[2]);          // create task for TT[2]
0021 trs[1] = generate_task(NTT[2]);         // create task for NTT[2]
0022 //   Call StartThreads( ) to run TT[2]/NTT[2] in parallel
0023 StartThreads(ts, trs, start count);
```

TABLE 1-continued

PSUEDO CODE FOR SCENARIO 200

```
0022      preprocess( );       // method of Thread class
0023      do_work(tr);         // method of Thread class
0024      postprocess( );      // method of Thread class
0025 }
```

In scenario 200, data related to each thread, specifically a "TSMReallocBit" is utilized to distinguish threads that can have thread-specific memory, such as stack and register storage, deallocated while sleeping from threads that maintain allocation of the stack and register memory. For example, if the TSMReallocBit set to ENABLE for a thread in scenario 200, the operating system can deallocate thread-specific memory while the thread is sleeping. However, if the TSMReallocBit set to ENABLE in scenario 200, the operating system can maintain thread-specific memory; e.g., the operating system does not reallocate thread-specific memory while the thread is sleeping. In some embodiments, a single bit per thread can perform the herein-described functionality of a TSMReallocBit; while in other embodiments, more than one bit per thread can perform the herein-described functionality of the TSMReallocBit.

Scenario 200 shows the effect of the TSMReallocBit bit during task processing by showing execution of two threads, FIG. 2A shows, at block 210, the call to StartThreads shown on line 0023 of in Table 2 above with three parameters: (a) an array of Threads ts[ ] with two threads: ts[0] referring to temporary-thread-specific memory thread TT[2], and ts[1] referring to non-temporary-thread-specific memory thread NTT[2]; (b) task request array trs[ ] with two task requests: trs[0] storing a task request for ts[0] and trs[1] storing a task request for ts[1]; and (c) start count, whose value is set to 2, indicating two threads and two corresponding task requests. As shown on lines 0007-0015 of Table 1 above, StartThreads function starts threads ts[0] and ts[1] in parallel to handle the two respective task requests tr[0] and tr[1].

StartThreads calls three functions for each thread in its ts[ ] array: ALLOC_TSM, Activate_Thread, and DEALLOC_TSM, which are discussed above in the context of FIG. 2. In scenario 200, ALLOC_TSM and DEALLOC_TSM can be modified to check the TSMReallocBit before respectively allocating or deallocating a stack or register storage for a thread; e.g., ALLOC_TSM and DEALLOC_TSM could immediately return if Thread.TSMReallocBit is set to DISABLE and thereby only perform a respective allocation or deallocation when Thread.TSMReallocBit is set to ENABLE.

The top portion of FIG. 2A shows "Example Parallel Thread Execution" starting at block 210 with the example application calling the StartThreads (ts, tr, count) function, as also shown above in Table 2, line 23. The StartThreads function call executes both ts[0]=TT[2] and ts[0]=NTT[2] in parallel, as shown in FIG. 2A in the "Example Parallel Thread Execution" section where the "PARALLEL OPERATION OF THREADS ts[0]=TT[2] AND ts[1]=NTT[2] BEGINS".

Figure 2B:
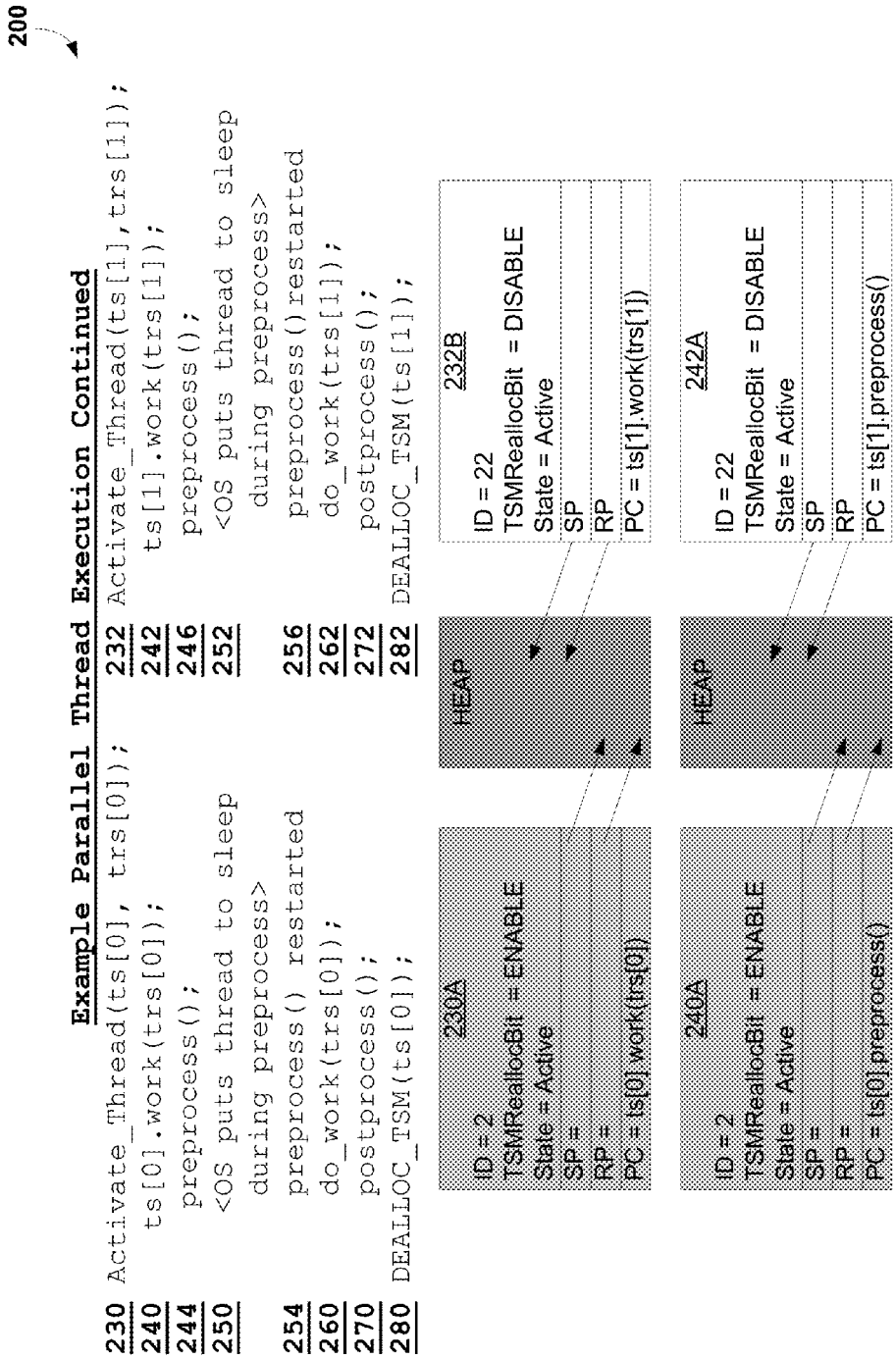

FIG. 2B shows thread control block 210A for thread ts[0]=TT[2], shown in grey, and thread control block 210B for ts[1]=NTT[2] at the end of block 210, shown in white. Thread control block 210A for ts[0] has an identifier of 2, a TSMReallocBit set to ENABLE, an execution state set to Dead, a stack pointer set to null, a register pointer set to null, and a program counter also set to null. Thread control block 210B for ts[1] has an identifier (ID) of 22, a TSMReallocBit set to DISABLE, an execution state set to Sleep, a stack pointer pointing to a memory location storing a stack for ts[1], a register pointer to a memory location in the heap used to store register values associated with ts[1], while the program counter remains set to null.

FIG. 2A shows temporary-thread-specific memory thread ts[0] in a sleep state does not use as much memory as non-temporary-thread-specific memory thread ts[1] in a sleep state. While both ts[0] and ts[1] have storage allocated for respective thread control blocks, ts[1] has a stack and register storage allocated even while asleep. In contrast, ts[0] does not have stack and register storage allocated during a similar sleep state.

For clarity's purposes, scenario 200 assumes ts[0] and ts[1] run in parallel at exactly the same pace. In other scenarios, ts[0] can run faster or slower than ts[1]; e.g., in extreme cases, ts[0] can complete before ts[1] begins or vice versa.

FIG. 2A shows that scenario 200 continues with both ts[0] executing ALLOC_TSM function at block 220 and ts[1] executing the ALLOC_TSM function at block 222. At block 220, the ALLOC_TSM function can examine the TSMReallocBit for ts[0], determine that the TSMReallocBit is enabled, and continue execution as discussed above to allocate thread-specific memory for ts[0], set the stack pointer and register pointers to point to the respective allocated stack and register storage, and set the execution state of ts[0] to Ready.

At block 222, the ALLOC_TSM function can examine the TSMReallocBit for ts[1], determine that the TSMReallocBit is disabled, and return without allocating memory as also discussed above.

FIG. 2A shows thread control block 220A for thread ts[0] and thread control block 222A for thread ts[1] after ALLOC_TSM( ) has executed for both threads. Thread control blocks 220A and 222B show that each of the ts[0] and ts[1] threads have: an execution state set to "Ready", a stack pointer pointing to a stack for the thread, a register pointer pointing to storage for register values associated with the thread, and a program counter set to null.

Turning to FIG. 2B, the "Example Parallel Thread Execution" shows that StartThreads for thread ts[0] continues at block 230 by executing the Activate_Thread function to perform task request trs[0]. Thread control block 230A shown in FIG. 2B at the end of block 230 shows the program counter at "ts[0].work(trs[0])". At block 232, StartThreads calls for thread ts[1] executes the Activate_Thread function to perform task request trs[1] with corresponding thread control block 232A at the end of block 232 with the program counter at "ts[1].work(trs[1])".

At block 240, Activate_Thread for thread ts[0] calls the work method of ts[0], with task request trs[0] passed as a parameter to work. Thread control block 240A of FIG. 2B indicates a state of thread ts[0] at the end of block 240, just before the preprocess method call is made by the work method. At block 242, Activate_Thread for thread ts[1] calls the work method of ts[1], with task request trs[1] passed as a parameter to work. Thread control block 242A of FIG. 2B indicates a state of thread ts[1] at the end of block 242, just before the preprocess method call is made by the work method.

At block 244, the preprocess method is called by the work method of ts[0] and at block 246, preprocess is called by the work method of ts[1].

Figure 2C:
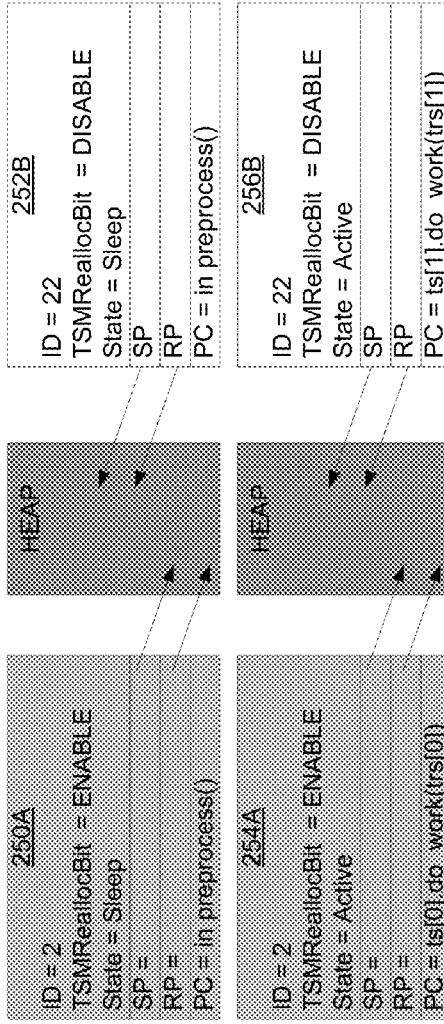

In scenario 200, the operating system puts both ts[0] and ts[1] to sleep during each respective thread's call to preprocess as indicated in the "Example Parallel Thread Execution" of FIG. 2C at blocks 250 and 252, respectively.

FIG. 2C additionally shows thread control block 250A at the end of block 250, just before ts[0] is removed from sleep with a state of "Sleep" and a program counter of "in preprocess( )" representing an interrupted call to preprocess for ts[0]. Also, as ts[0] was put to sleep while performing tasks for the application, the operating system does not deallocate either the stack or the register storage for ts[0] regardless of the state of the TSMReallocBit. Thread control block 250A indicates the continued allocation of a stack and register storage to ts[0] by showing the stack pointer and register pointer pointing into the heap, as opposed to being set to null.

Thread control block 252A for ts[1] shows a state of "Sleep", a program counter of "in preprocess( )" representing an interrupted call to preprocess for ts[1] and non-null stack and register pointers.

Scenario 200 continues at block 254 where ts[0] is restarted and at block 256 where ts[1] is restarted. After the threads are restarted, each thread begins executing its respective preprocess method. FIG. 2C shows thread control block 254A at the end of block 254, just before ts[0] calls do work and shows thread control block 256B at the end of block 256, just before ts[1] calls do work. Respective thread control blocks 254A, 256A show that respective threads ts[0] and ts[1] are in the active state, the program counter for ts[0] is at the entry of the "ts[0]. do_work(trs[0])" method call, and the program counter for ts[1] is at the entry of the "ts[1]. do_work(trs[1])" method call.

Figure 2D:
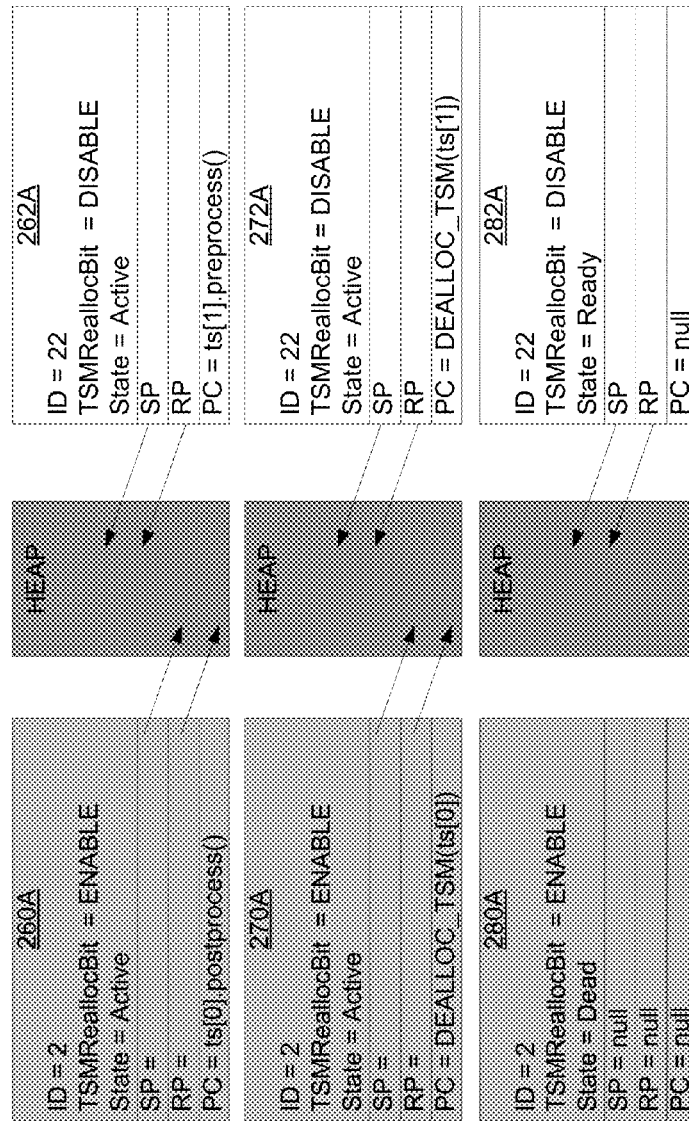

FIG. 2D shows that scenario 200 continues at block 260, where the work method of ts[0] calls the do_work(trs[0]) method to perform task request trs[0], and at block 262, where the work method of ts[1] calls the do_work(trs[1]) method to perform task request trs[1]. Additionally, FIG. 2D shows respective thread control blocks 260A for ts[0] after the do_work(trs[0]) call and 262A for ts[1] after the do_work(trs[1]) call.

The "Example Parallel Thread Execution" portion of FIG. 2D shows that at block 270, the work method of ts[0] calls the postprocess method and at block 272, the work method of ts[1] calls the postprocess method. FIG. 2D shows thread control blocks 270A and 272A for threads ts[0] and ts[1], respectively, at the end of their respective postprocess method calls.

Scenario 200 continues with DEALLOC_TSM being called by ts[0] at block 280 and by ts[1] at block 282. As discussed above in the context of the ALLOC_TSM function, DEALLOC_TSM can examine the TSMReallocBit of a thread and only deallocate thread-specific memory from a thread when the TSMReallocBit is enabled.

FIG. 2D shows control block 280A for thread ts[0] after DEALLOC_TSM has executed. As the TSMReallocBit for ts[0] is set to ENABLE, the DEALLOC_TSM function can determine that ts[0]'s thread-specific memory is to be deallocated from ts[0]. After DEALLOC_TSM has executed, the execution state for ts[0] is set to "Dead", the stack pointer and register pointers both point to null, and the program counter is set to null to indicate that ts[0] does not have a next instruction to execute at this time.

FIG. 2 shows control block 282A for thread ts[1] after DEALLOC_TSM has executed. As the TSMReallocBit for ts[1] is set to DISABLE, the DEALLOC_TSM function can determine that ts[1]'s stack and register storage are to remain allocated to ts[1]. After DEALLOC_TSM has executed, the execution state for ts[1] is set to "Ready", the stack pointer and register pointers both point to heap storage allocated, respectively for the stack and register storage of ts[1], and the program counter is set to null to indicate that ts[1] does not have a next instruction to execute at this time.

Scenario 200 ends after both the ts[0] and ts[1] threads have executed DEALLOC_TSM at respective blocks 280 and 282.

Example Data Network

Figure 3:
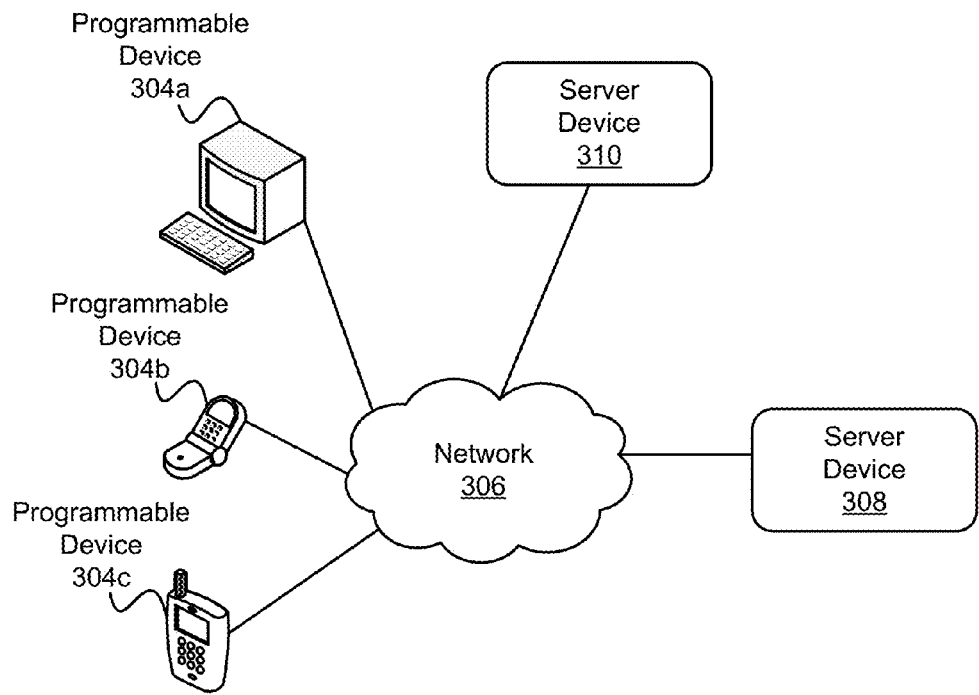
FIG. 3 depicts a distributed computing architecture, in accordance with an example embodiment.

FIG. 3 shows server devices 308, 310 configured to communicate, via network 306, with programmable devices 304a, 304b, and 304c. Network 306 may correspond to a LAN, a wide area network (WAN), a corporate intranet, the public Internet, or any other type of network configured to provide a communications path between networked computing devices. The network 306 may also correspond to a combination of one or more LANs, WANs, corporate intranets, and/or the public Internet.

Although FIG. 3 only shows three programmable devices, distributed application architectures may serve tens, hundreds, or thousands of programmable devices. Moreover, programmable devices 304a, 304b, and 304c (or any additional programmable devices) may be any sort of computing device, such as an ordinary laptop computer, desktop computer, network terminal, wireless communication device (e.g., a cell phone or smart phone), and so on. In some embodiments, programmable devices 304a, 304b, and 304c may be dedicated to the design and use of software applications. In other embodiments, programmable devices 304a, 304b, and 304c may be general purpose computers that are configured to perform a number of tasks and need not be dedicated to software development tools. In still other embodiments, programmable devices 304a, 304b, and/or 304c can be configured to perform some or all of the herein-described functionality of a computing device.

Server devices 308, 310 can be configured to perform one or more services, as requested by programmable devices 304a, 304b, and/or 304c. For example, server device 308 and/or 310 can provide content to programmable devices 304a-304c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 308 and/or 310 can provide programmable devices 304a-304c with access to software for database, search, computation, graphical, audio, video, World Wide Web/Internet utilization, and/or other functions. Many other examples of server devices are possible as well.

Computing Device Architecture

Figure 4A:
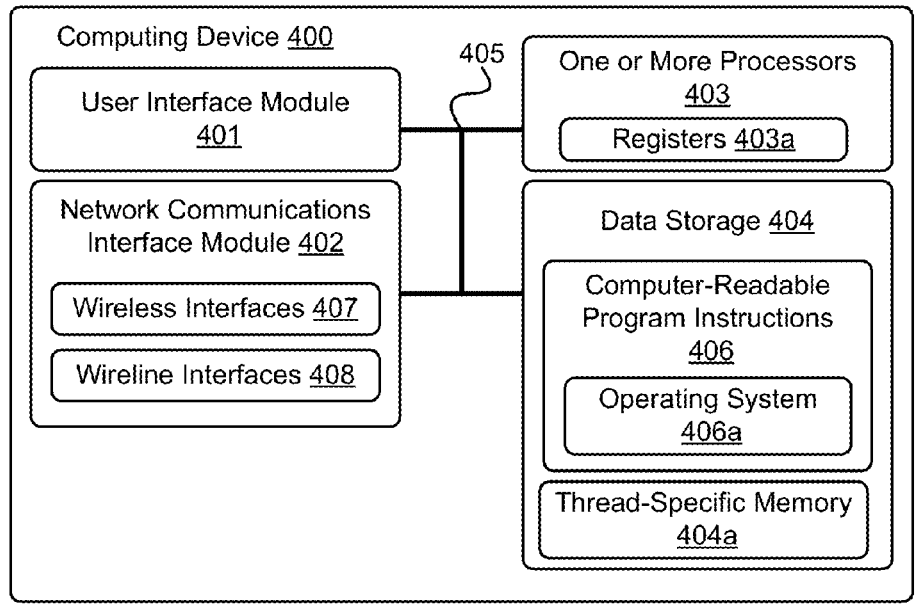
FIG. 4A is a block diagram of a computing device, in accordance with an example embodiment.

FIG. 4A is a block diagram of a computing device (e.g., system) in accordance with an example embodiment. In particular, computing device 400 shown in FIG. 4A can be configured to perform part or all of method 100, part or all of scenarios 200, one or more functions of server devices 308, 310, network 306, and/or one or more of programmable devices 304a, 304b, and 304c. Computing device 400 may include a user interface module 401, a network-communication interface module 402, one or more processors 403, and data storage 404, all of which may be linked together via a system bus, network, or other connection mechanism 405.

User interface module 401 can be operable to send data to and/or receive data from external user input/output devices. For example, user interface module 401 can be configured to send and/or receive data to and/or from user input devices such as a keyboard, a keypad, a touch screen, a computer mouse, a track ball, a joystick, a camera, a voice recognition module, and/or other similar devices. User interface module 401 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 401 can also be configured to generate audible output(s), such as a speaker, speaker jack, audio output port, audio output device, earphones, and/or other similar devices.

Network-communications interface module 402 can include one or more wireless interfaces 407 and/or one or more wireline interfaces 408 that are configurable to communicate via a network, such as network 306 shown in FIG. 3. Wireless interfaces 407 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 408 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 402 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 403 can include one or more general purpose processors and/or one or more special purpose processors (e.g., digital signal processors, application specific integrated circuits, etc.). Processors 403 can be configured to execute computer-readable program instructions 406a that are contained in the data storage 404 and/or other instructions as described herein. In some embodiments, one or more processors of processors 403 can include one or more registers 403a. A register is a small amount of memory; e.g., a few bits or bytes, accessible to the processor and is separate from data storage 404. Typically, registers 403a can be accessed faster by processor(s) 403 than data storage 404, but registers 403a typically store significantly less information than data storage 404.

Data storage 404 can include one or more computer-readable storage media that can be read and/or accessed by at least one of processors 403. The one or more computer-readable storage media can include volatile and/or non-volatile storage components, such as optical, magnetic, organic or other memory or disc storage, which can be integrated in whole or in part with at least one of processors 403. In some embodiments, data storage 404 can be implemented using a single physical device (e.g., one optical, magnetic, organic or other memory or disc storage unit), while in other embodiments, data storage 404 can be implemented using two or more physical devices.

Data storage 404 can include computer-readable program instructions 406. Some of computer-readable program instructions 406 can be instructions for operating system 406a. Operating system 406a can be used to schedule applications, threads, and other processes for execution on processor(s) 403, execute applications, threads, and/or other processes using processor(s) 403, allocate part or all of data storage 404, and control devices; e.g., devices used as user interface module 401 and/or network communications interface module 402. In some embodiments, data storage 404 can additionally include storage required to perform at least part of the herein-described methods and techniques and/or at least part of the functionality of the herein-described devices and networks.

In some embodiments, such as shown in FIG. 4A, data storage 404 can include thread-specific memory 404a. Thread-specific memory 404a can be configured to store one or more processor stacks, processor register data, and other data used by processor(s) 403 to execute one or more thread(s), application(s), and process(es). Each processor stack can include storage used by processor(s) 403 for maintaining/storing variable values, function parameter values, and functions called by an executing thread, application, or process. Each instance of processor register data can include storage to back up one or more registers, such as register(s) 403(a) of processor(s) 403, executing the thread, application, or process. Other data used by processor(s) 403 can include system-specific data and additional data used by processor(s) 403 to execute the thread, application, or process that is not part of a processor stack or an instance of processor register data.

Cloud-Based Servers

Figure 4B:
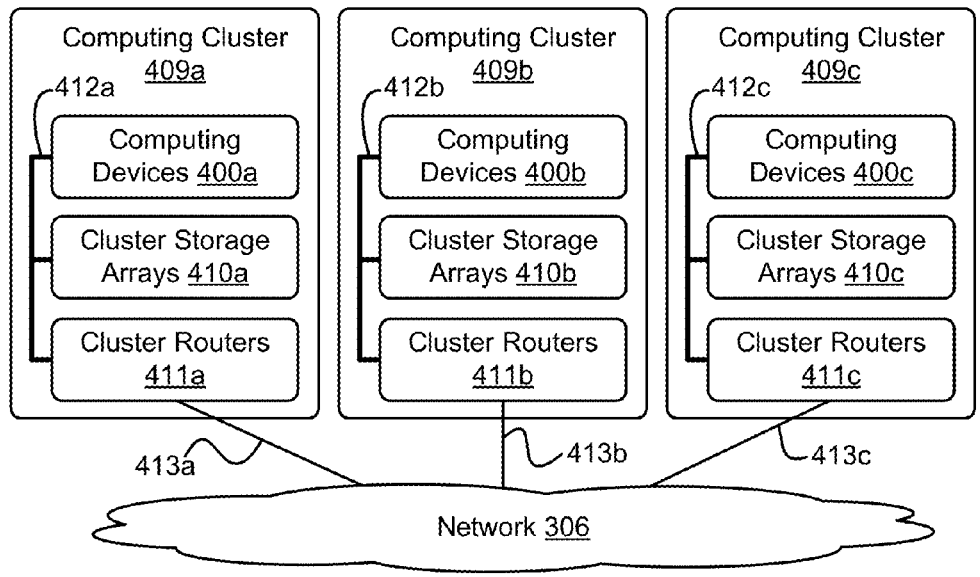
FIG. 4B depicts a cloud-based server system, in accordance with an example embodiment.

FIG. 4B depicts a network 406 of computing clusters 409a, 409b, 409c arranged as a cloud-based server system in accordance with an example embodiment. Server devices 308 and/or 310 can be cloud-based devices that store program logic and/or data of cloud-based applications and/or services. In some embodiments, server devices 308 and/or 310 can be a single computing device residing in a single computing center. In other embodiments, server device 308 and/or 310 can include multiple computing devices in a single computing center, or even multiple computing devices located in multiple computing centers located in diverse geographic locations. For example, FIG. 4 depicts each of server devices 308 and 310 residing in different physical locations.

In some embodiments, data and services at server devices 308 and/or 310 can be encoded as computer readable information stored in non-transitory, tangible computer readable media (or computer readable storage media) and accessible by programmable devices 404a, 404b, and 404c, and/or other computing devices. In some embodiments, data at server device 308 and/or 310 can be stored on a single disk drive or other tangible storage media, or can be implemented on multiple disk drives or other tangible storage media located at one or more diverse geographic locations.

FIG. 4B depicts a cloud-based server system in accordance with an example embodiment. In FIG. 4B, the functions of server device 308 and/or 310 can be distributed among three computing clusters 409a, 409b, and 409c. Computing cluster 409a can include one or more computing devices 400a, cluster storage arrays 410a, and cluster routers 411a connected by a local cluster network 412a. Similarly, computing cluster 409b can include one or more computing devices 400b, cluster storage arrays 410b, and cluster routers 411b connected by a local cluster network 412b. Likewise, computing cluster 409c can include one or more computing devices 400c, cluster storage arrays 410c, and cluster routers 411c connected by a local cluster network 412c.

In some embodiments, each of the computing clusters 409a, 409b, and 409c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 409a, for example, computing devices 400a can be configured to perform various computing tasks of electronic communications server 412. In one embodiment, the various functionalities of electronic communications server 412 can be distributed among one or more of computing devices 400a, 400b, and 400c. Computing devices 400b and 400c in computing clusters 409b and 409c can be configured similarly to computing devices 400a in computing cluster 409a. On the other hand, in some embodiments, computing devices 400a, 400b, and 400c can be configured to perform different functions.

In some embodiments, computing tasks and stored data associated with server devices 308 and/or 310 can be distributed across computing devices 400a, 400b, and 400c based at least in part on the processing requirements of server devices 308 and/or 310, the processing capabilities of computing devices 400a, 400b, and 400c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 410a, 410b, and 410c of the computing clusters 409a, 409b, and 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 308 and/or 310 can be distributed across computing devices 400a, 400b, and 400c of computing clusters 409a, 409b, and 409c, various active portions and/or backup portions of these components can be distributed across cluster storage arrays 410a, 410b, and 410c. For example, some cluster storage arrays can be configured to store the data of server device 308, while other cluster storage arrays can store data of server device 310. Additionally, some cluster storage arrays can be configured to store backup versions of data stored in other cluster storage arrays.

The cluster routers 411a, 411b, and 411c in computing clusters 409a, 409b, and 409c can include networking equipment configured to provide internal and external communications for the computing clusters. For example, the cluster routers 411a in computing cluster 409a can include one or more internet switching and routing devices configured to provide (i) local area network communications between the computing devices 400a and the cluster storage arrays 401a via the local cluster network 412a, and (ii) wide area network communications between the computing cluster 409a and the computing clusters 409b and 409c via the wide area network connection 413a to network 406. Cluster routers 411b and 411c can include network equipment similar to the cluster routers 411a, and cluster routers 411b and 411c can perform similar networking functions for computing clusters 409b and 409b that cluster routers 411a perform for computing cluster 409a.

In some embodiments, the configuration of the cluster routers 411a, 411b, and 411c can be based at least in part on the data communication requirements of the computing devices and cluster storage arrays, the data communications capabilities of the network equipment in the cluster routers 411a, 411b, and 411c, the latency and throughput of local networks 412a, 412b, 412c, the latency, throughput, and cost of wide area network links 413a, 413b, and 413c, and/or other factors that can contribute to the cost, speed, fault-tolerance, resiliency, efficiency and/or other design goals of the moderation system architecture.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
generating a plurality of threads associated with an application configured for execution on a computing device;
receiving, at the computing device, an allocation request to allocate thread-specific memory for an executable thread of the plurality of threads;
in response to the allocation request, the computing device:
allocating storage for the thread-specific memory,
establishing one or more associations between the allocated thread-specific memory and the executable thread, wherein the allocated thread-specific memory comprises register storage and a call stack for the executable thread, wherein the one or more associations comprise an association between the call stack and the executable thread, and wherein the call stack stores data regarding return addresses and variables associated with a function called by the executable thread, and providing an indication that the executable thread is ready for execution;

after providing the indication that the executable thread is ready for execution, executing the executable thread using the computing device;

receiving, at the computing device, a sleep request to suspend execution of the executable thread via a function referenced by the executable thread, wherein the function referenced by the executable thread comprises a thread-specific-storage-allocation parameter that indicates whether the executable thread requests deallocation of thread-specific memory; and in response to the sleep request to suspend execution of the executable thread, the computing device:

determining whether the thread-specific-storage-allocation parameter indicates that the allocated thread-specific memory is to be deallocated for the executable thread, and in response to the thread-specific-storage-allocation parameter indicating that the allocated thread-specific memory is to be deallocated for the executable thread:

deallocating storage for the allocated thread-specific memory, setting the register storage to a null value, and setting at least the association between the call stack and the executable thread to a null value to indicate that at least the call stack of the thread-specific memory is not allocated to the executable thread.

2. The method of claim 1, wherein the call stack comprises storage for a local variable.

3. The method of claim 1, wherein the computing device comprises one or more registers, each register configured to store at least one bit, and wherein the register storage for processor register data to store contents of the one or more registers for the executable thread.

4. The method of claim 1, wherein the executable thread is configured to perform at least one task for the application, and wherein executing the executable thread using the computing device comprises executing the executable thread to perform the at least one task.

5. The method of claim 1, further comprising:
receiving a request to restart the executable thread for execution; and
determining whether thread-specific memory is allocated to the executable thread.

6. The method of claim 5, further comprising:
in response to determining that thread-specific memory is not allocated to the executable thread:
reallocating the allocated thread-specific memory to the executable thread; and
establishing an association between the reallocated thread-specific memory and the executable thread.

7. The method of claim 5, further comprising:
in response to determining that thread-specific memory is not allocated to the executable thread:
making a request to allocate at least as much storage to the executable thread as previously allocated to the allocated thread-specific memory;
determining whether the request to allocate the at least as much storage is a successful request; and in response to the request to allocate the at least as much storage being a successful request:
allocating a second thread-specific memory to the executable thread, wherein the second thread-specific memory comprises a second call stack, wherein the second thread-specific memory differs from the allocated thread-specific memory, and wherein the at least as much storage comprises the second thread-specific memory, and
establishing an association between the second thread-specific memory and the executable thread.

8. The method of claim 5, further comprising:
in response to determining that thread-specific memory is not allocated to the executable thread:
making a request to allocate at least as much storage to the executable thread as previously allocated to the allocated thread-specific memory;
determining whether the request to allocate the at least as much storage is a successful request; and
in response to the request to allocate the at least as much storage being an unsuccessful request:
allocating a new thread-specific memory to the executable thread, wherein the new thread-specific memory comprises a third call stack, and
establishing an association between the new thread-specific memory and the executable thread.

9. The method of claim 5, further comprising:
in response to determining that thread-specific memory is not allocated to the executable thread:
making one or more requests to allocate at least as much storage to the executable thread as previously allocated to the allocated thread-specific memory;
determining whether all of the one or more requests to allocate the at least as much storage are unsuccessful requests; and
in response to all of the one or more requests to allocate the at least as much storage being unsuccessful requests:
providing an indication that thread-specific memory for the executable thread is unavailable, and
setting an execution state for the executable thread to deinitialized.

10. The method of claim 1, wherein deallocating storage for the allocated thread-specific memory further comprises deallocating all of the storage allocated to the call stack.

11. The method of claim 1, wherein deallocating storage for the allocated thread-specific memory further comprises deallocating storage allocated for storing values of one or more registers.

12. The method of claim 1, wherein receiving the sleep request to suspend execution of the executable thread comprises:
determining whether the executable thread has returned from a thread entry point; and
in response to determining that the executable thread has returned from the thread entry point, suspending execution of the executable thread at the computing device.

13. An article of manufacture including a non-transitory computer-readable storage medium having instructions stored thereon that, when executed by a processor, cause the processor to perform functions comprising:
generating a plurality of threads associated with an application configured for execution by the processor;
receiving an allocation request to allocate thread-specific memory for an executable thread of the plurality of threads;

in response to the allocation request:
  allocating storage for the thread-specific memory,
  establishing one or more associations between the allocated thread-specific memory and the executable thread, wherein the allocated thread-specific memory comprises register storage and a call stack for the executable thread, wherein the one or more associations comprise an association between the call stack and the executable thread, and wherein the call stack stores data regarding return addresses and variables associated with a function called by the executable thread, and
  providing an indication that the executable thread is ready for execution;
after providing the indication that the executable thread is ready for execution, executing the executable thread;
receiving a sleep request to suspend execution of the executable thread via a function referenced by the executable thread, wherein the function referenced by the executable thread comprises a thread-specific-storage-allocation parameter that indicates whether the executable thread requests deallocation of thread-specific memory; and
in response to the sleep request to suspend execution of the executable thread:
  determining whether the thread-specific-storage-allocation parameter indicates that the allocated thread-specific memory is to be deallocated for the executable thread, and
  in response the thread-specific-storage-allocation parameter indicating that the allocated thread-specific memory is to be deallocated for the executable thread:
    deallocating storage for the allocated thread-specific memory,
    setting the register storage to a null value, and
    setting at least the association between the call stack and the executable thread to a null value to indicate that at least the call stack of the thread-specific memory is not allocated to the executable thread.

14. The article of manufacture of claim 13, wherein the call stack comprises storage for a local variable.

15. The article of manufacture of claim 13, wherein the functions further comprise:
  receiving a request to restart the executable thread for execution; and
  determining whether thread-specific memory is allocated to the executable thread.

16. The article of manufacture of claim 15, wherein the functions further comprise:
  in response to determining that thread-specific memory is not allocated to the executable thread:
    reallocating the allocated thread-specific memory to the executable thread; and
    establishing an association between the reallocated thread-specific memory and the executable thread.

17. The article of manufacture of claim 15, wherein the functions further comprise:
  in response to determining that thread-specific memory is not allocated to the executable thread:
    making a request to allocate at least as much storage to the executable thread as previously allocated to the allocated thread-specific memory;
    determining whether the request to allocate the at least as much storage is a successful request; and
    in response to the request to allocate the at least as much storage being a successful request:
      allocating a second thread-specific memory to the executable thread, wherein the second thread-specific memory comprises a second call stack, wherein the second thread-specific memory differs from the allocated thread-specific memory, and wherein the at least as much storage comprises the second thread-specific memory, and
      establishing an association between the second thread-specific memory and the executable thread.

18. The article of manufacture of claim 15, further comprising:
  in response to determining that thread-specific memory is not allocated to the executable thread:
    making one or more requests to allocate at least as much storage to the executable thread as previously allocated to the allocated thread-specific memory;
    determining whether all of the one or more requests to allocate the at least as much storage are unsuccessful requests; and
    in response to all of the one or more requests to allocate the at least as much storage being unsuccessful requests:
      providing an indication that thread-specific memory for the executable thread is unavailable, and
      setting an execution state for the executable thread to deinitialized.

19. A computing device, comprising:
a processor; and
a non-transitory computer-readable storage medium having instructions stored thereon that, when executed by the processor, cause the processor to perform functions comprising:
  generating a plurality of threads associated with an application configured for execution by the processor;
  receiving an allocation request to allocate thread-specific memory for an executable thread of the plurality of threads;
  in response to the allocation request:
    allocating storage for the thread-specific memory,
    establishing one or more associations between the previously allocated thread-specific memory and the executable thread, wherein the previously allocated thread-specific memory comprises register storage and a call stack for the executable thread, wherein the one or more associations comprise an association between the call stack and the executable thread and wherein the call stack stores data regarding return addresses and variables associated with a function called by the executable thread, and
    providing an indication that the executable thread is ready for execution;
  after providing the indication that the executable thread is ready for execution, executing the executable thread;
  receiving a sleep request to suspend execution of the executable thread via a function referenced by the executable thread, wherein the function referenced by the executable thread comprises a thread-specific-storage-allocation parameter that indicates whether the executable thread requests deallocation of thread-specific memory; and
  in response to the sleep request to suspend execution of the executable thread:

determining whether the thread-specific-storage-allocation parameter indicates that the allocated thread-specific memory is to be deallocated for the executable thread, and in response to the thread-specific-storage-allocation parameter indicating that the allocated thread-specific memory is to be deallocated for the executable thread:

deallocating storage for the allocated thread-specific memory, setting the register storage to a null value, and setting at least the association between the call stack and the executable thread to a null value to indicate that at least the call stack of the thread-specific memory is not allocated to the executable thread.

20. The computing device of claim 19, wherein receiving the sleep request to suspend execution of the executable thread comprises:

determining whether the executable thread has returned from a thread entry point; and in response to determining that the executable thread has returned from the thread entry point, suspending execution of the executable thread.

21. A method, comprising:

receiving, at a computing device, an allocation request to allocate thread-specific memory for an executable thread of a plurality of threads associated with an application configured for execution on the computing device;

in response to the allocation request, the computing device:

allocating storage for the thread-specific memory, establishing one or more associations between the allocated thread-specific memory and the executable thread, wherein the allocated thread-specific memory comprises register storage and a call stack for the executable thread, wherein the one or more associations comprise an association between the call stack and the executable thread, and wherein the call stack stores data regarding return addresses and variables associated with a function called by the executable thread, and providing an indication that the executable thread is ready for execution;

receiving, after providing the indication that the executable thread is ready for execution at the computing device, a sleep request to suspend execution of the executable thread via a function referenced by the executable thread, wherein the function referenced by the executable thread comprises a thread-specific-storage-allocation parameter that indicates whether the executable thread requests deallocation of thread-specific memory; and in response to the sleep request, the computing device:

determining whether the thread-specific-storage-allocation parameter indicates that the allocated thread-specific memory is to be deallocated for the executable thread, and in response to the thread-specific-storage-allocation parameter indicating that the allocated thread-specific memory is to be deallocated for the executable thread:

deallocating storage for the allocated thread-specific memory, setting the register storage to a null value, and setting at least the association between the call stack and the executable thread to a null value to indicate that at least the call stack of the thread-specific memory is not allocated to the executable thread.

22. The method of claim 21, wherein the call stack comprises storage for a local variable of the executable thread.

23. The method of claim 21, wherein the executable thread is configured to perform at least one task for the application, and wherein the method further comprises:

after providing the indication that the executable thread is ready for execution, executing the executable thread to perform the at least one task.

* * * * *